United States Patent [19]
de Baynast de Septfontaines et al.
[11] Patent Number: 4,886,672
[45] Date of Patent: Dec. 12, 1989

[54] PROCESS FOR THE LIQUEFACTION OF BEETS AND CHICORY ROOTS BY ENZYMATIC HYDROLYSIS AND LIQUID HYDROLYSATE OBTAINED

[75] Inventors: Regis J. M. P. de Baynast de Septfontaines, Versailles; Francois E. M. E. Brouard, Orleans; Jean-Luc A. G. Baret, Moret-sur-Loing; Yvon G. A. J. M. Gicquiaux, Saint-Witz, all of France; Hans S. Olsen, Holte, Denmark

[73] Assignees: Sucre Recherches et Developpement, Paris Cedex, France; Novo Industri A/S, Bagsvaerd, Denmark

[21] Appl. No.: 171,006

[22] PCT Filed: Jul. 7, 1987

[86] PCT No.: PCT/FR87/00265

§ 371 Date: Mar. 2, 1988

§ 102(e) Date: Mar. 2, 1988

[87] PCT Pub. No.: WO88/00243

PCT Pub. Date: Jan. 14, 1988

[30] Foreign Application Priority Data

Jul. 7, 1986 [FR] France ................................ 86 09841

[51] Int. Cl.[4] ............................................ A23L 1/214

[52] U.S. Cl. ........................................ 426/48; 426/52; 426/658; 127/37; 127/66

[58] Field of Search .................... 426/7, 48, 51, 52, 60, 426/658; 127/58–61, 29, 46.1, 48, 50, 53, 36–37, 42, 66

[56] References Cited

U.S. PATENT DOCUMENTS 4,544,558 10/1985 Pellegrini ............................. 426/48

OTHER PUBLICATIONS

Chemical Abstracts, vol. 104, No. 26, Jun. 30, 1986, 104:227697x.

Beldman et al., "Application of Cellulase and Pectinase from Fungal Origin for the Liquefaction and Saccharification of Biomass" in Enzyme Microb. Technol., vol. 6, Nov. 1984, pp. 503–507.

Olsen, "Method for Decomposition of Polysaccharides, Preferably Plant Cell Wall Polyscaccharides by Means of a Carbohydrase", No. 217, 1982, pp. 190, 193.

*Primary Examiner*—Marianne Cintins
*Attorney, Agent, or Firm*—Watson, Cole, Grindle & Watson

[57] ABSTRACT

A process for the liquifaction of beets or chicory roots which includes washing and grinding the beets or chicory roots to provide a ground product; mixing the ground product with a mixture of enzymes that include SPS-ase, cellulase and cellobiase, as well as an acid so as to provide a pH of about 3 to 5.5; leaving the mixture for about 1 to 6 hours to accomplish a prehydrolysis of the ground product; grinding the prehydrolyzed ground product; allowing the prehydrolyzed ground product to hydrolyze for about 20 to 120 hours; and recovering the liquid hydrolyzed product.

15 Claims, 1 Drawing Sheet

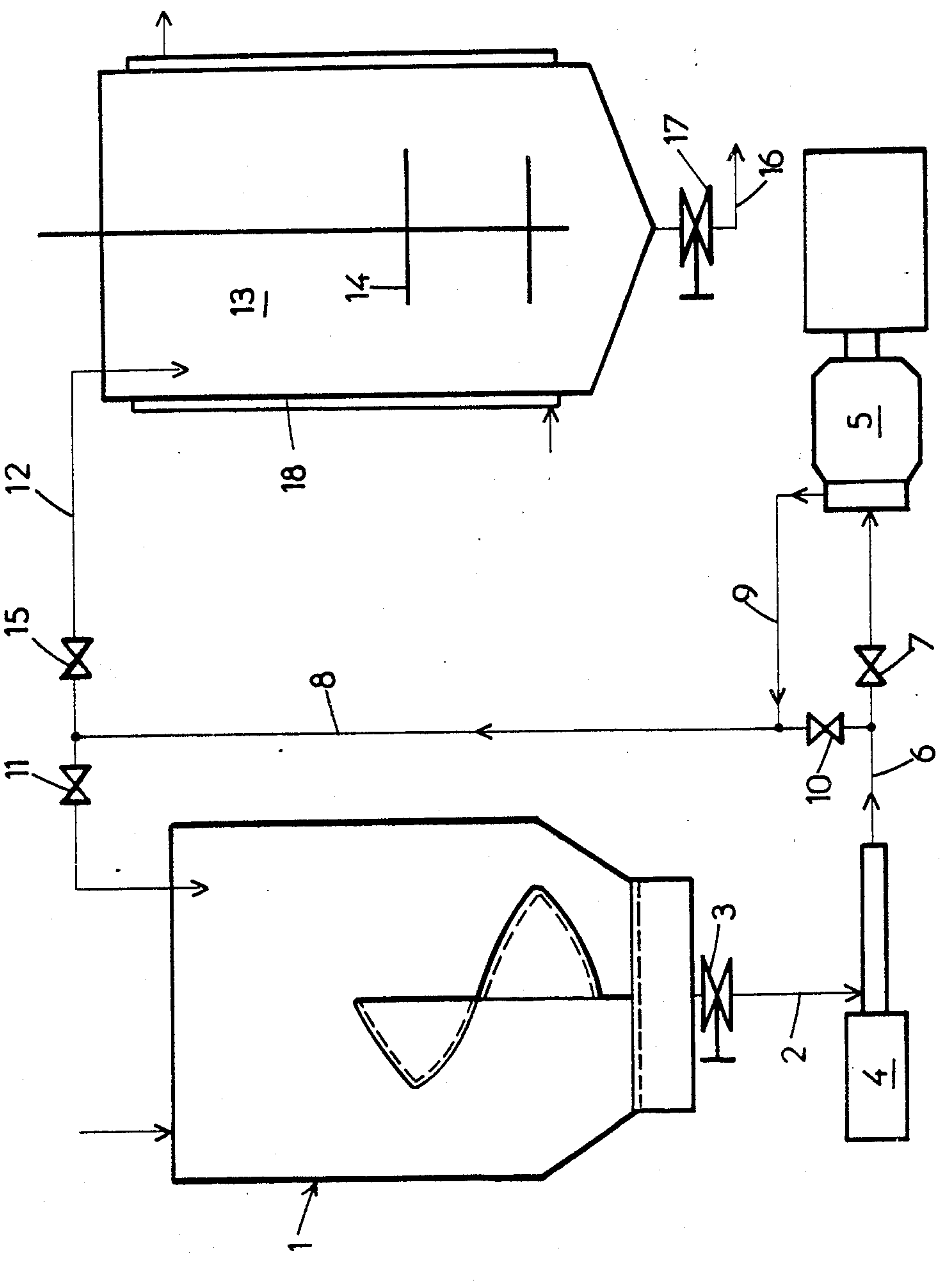
1
2
3
4
5
6
7
8
9
10
11
12
13
14
15
16
17
18

PROCESS FOR THE LIQUEFACTION OF BEETS AND CHICORY ROOTS BY ENZYMATIC HYDROLYSIS AND LIQUID HYDROLYSATE OBTAINED

The invention relates to a process for the liquefaction of beets and chicory roots by an enzymatic method and to the liquid hydrolysate obtained.

The usual method of treating sugar beets consists of cutting them into thin strips and extracting the sucrose therefrom by diffusion. A sugary juice is thus obtained, which may be used for the production of food sugar. This sugary juice may also be subjected to an alcoholic fermentation in order to produce ethyl alcohol. After extraction by diffusion, there remains a pulp which may be used, after drying, in animal feeds.

The subject of the present invention is a new process for converting beets directly by an enzymatic method into a liquid hydrolysate without having to use an extraction by diffusion, and without the need for adding water before of during the treatment.

Moreover, it has been found that the process of the invention can also be applied to chicory roots.

More specifically, the invention relates to a process for the liquefaction of beets or chicory roots, comprising the following stages:

(a) coarse grinding of beets or of chicory roots which have previously been washed, so as to reduce them into small pieces;

(b) adding to and mixing with the beets or the chicory roots, during or after their grinding, an effective proportion of a mixture of enzymes containing at least one SPS-ase, one cellulase and one cellobiase, and an acid so as to adjust the pH of the ground product to within the range of from about 3 to 5.5;

(c) leaving the enzyme mixture to accomplish a prehydrolysis of the ground product for approximately 1 to 6 hours;

(d) during or after stage (c), fine grinding of the product into a slurry form;

(e) continuing the hydrolysis of the ground product in the slurry form by ---- the enzyme mixture for approximately 20 to 120 hours; and (f) recovering the resulting liquid hydrolysed product.

The process of the invention may be applied to sugar beets as well as to fodder beets and to hybrids of these types of beets.

The coarse grinding (a) of beets or of chicory roots may be carried out without adding water, in any type of suitable grinder-mixer, for example of the rotary helical blade type. In this stage, the beets or the chicory roots are ground into small pieces of a size of the order of approximately 1 cm.

The acid added in stage (b) may be an inorganic or organic acid. Sulfuric acid is particularly well suited. The acid is added so that the pH is within the range 3–5.5, preferably 3.5–5. The enzyme mixture employed for accomplishing the prehydrolysis (c) as well as the hydrolysis (e) must contain at least one SPS-ase, one cellulase and one cellobiase.

It is often essential to add a bacteriostatic agent which does not affect the action of the enzymes in stage (b). An example of bacteriostatic agent which may be employed is formol at a rate of approximatley 0.5 to 2 liters per ton of beets or of chicory roots (0.05 to 0.2%), preferably at a rate of approximately 1 liter per ton (0.1%). This agent is employed to avoid microbial proliferations. Bacteriostatic agents other than formol could, of course, be employed, but formol has the advantage of being inexpensive and readily available.

SPS-ase and its preparation are described in detail in FR-A-No. 2,518,570 in the name of NOVO INDUSTRI A/S. This enzyme is commonly obtained from microorganisms of the genus *Aspergillus.*

An enzyme composition containing SPS-ase, cellulase and cellobiase is marketed by the Danish company NOVO INDUSTRI A/S under the name "SP 249" and has the following enzyme activities, described according to the international nomenclature.

| | |
|---|---|
| Pectinases: | |
| Pectinesterase | EC 3.1.1.11 |
| Polygalacturonase | EC 3.2.1.15 |
| Exopolygalacturonase | EC 3.2.1.67 |
| Pectinelyase (transeliminase) | EC 4.2.2.2 |
| Cellulases: | |
| Endo-1,4 beta-glucanase | EC 3.2.1.4 |
| Hemicellulases: | |
| Alpha-glucosidase | EC 3.2.1.20 |
| Beta-glucosidase | EC 3.2.1.21 |
| Alpha-galactosidase | EC 3.2.1.22 |
| Beta-galactosidase | EC 3.2.1.23 |
| Beta-mannosidase | EC 3.2.1.25 |
| Alpha-L-arabinofuranosidase | EC 3.2.1.55 |
| Endo-1,4 beta-mannanase | EC 3.2.1.78 |

"SP 249" is a brown liquid, the main specifications for which are as follows:

| | | |
|---|---|---|
| polygalacturonase (EC 3.2.1.15) | 9640 | PGU/g |
| pectinase | 2152 | KPU/g |
| SPS-ase | 29 | SPSU/g |
| cellulase (EC 3.2.1.4) | 673 | A-NCU/g |
| fungal β-glucanase (EC 3.2.1.4) | 84 | FBGU/g |
| hemicellulase (EC 3.2.1.78) | 225 | KVHCU/g |

As the cellulase and cellobiase activities of SP 249 are fairly low, they may be reinforced by adding additional amounts of cellulase and cellobiase enzymes. Such an addition is essential in the case of the treatment of beets and is only optional in the case of the treatment of chicory roots.

As cellulase, it is possible to use, for example, that produced by submerged fermentation by a *Trichoderma reesei* strain. An example of a cellulase of this type is the product Celluclast® sold by the Danish company NOVO INDUSTRI A/S. Celluclast® has a cellulase activity of 1,500 ANCU/g and also has cellobiohydrolase (EC 3.2.1.91) and exo-beta-1,4D-glucosidase (EC 3.2.1.74) exoactivities and endo-beta-1,4D-glucanase (EC 3.2.1.4) endoactivity. Another useful cellulase available on the market is "SP-300" which is also produced by NOVO INDUSTRI A/S.

As cellobiase, it is possible to use, for example, that produced by submerged fermentation by an *Aspergillus niger* strain. An example of cellobiase of this type is the product "Novozym 188" sold by the Danish company NOVO INDUSTRI A/S, which has a cellobiase activity of 250 CBU/g.

These enzymes may be employed in varied relative proportions. By way of indication, it is possible to employ 50–75% of SP 249, 5–50% of Celluclast and 5–50% of Novozym 188, these proportions being by weight relative to the total weight of enzymes. Other enzymes such as pectinases, glucanases, galactomannases, proteases and the like may be present, if desired, in the above mentioned enzyme mixture.

The proportion of enzymes relative to beets or chicory roots may also vary widely. In terms of activity units per kg of dry matter contained in beets or chicory roots, the enzymes could be employed in the following ranges:

| | Units/kg of dry matter | |
|---|---|---|
| Enzyme | Wide range | Preferred range |
| SPS-ase | 15 to 800 | 20 to 190 |
| Cellulase | 380–42000 | 700 to 7000 |
| Cellobiase | 10–4500 | 20 to 400 |

The optional enzymes, for their part, may be present within the following activity ranges:

| | Units/kg of dry matter | |
|---|---|---|
| Enzyme | Wide range | Preferred range |
| Polygalacturonase | 5000–250000 | 9000 to 60000 |
| Pectinase | 1000–55000 | 2000 to 14000 |
| Fungal $\beta$-glucanase | 40–2500 | 80 to 550 |
| Hemicellulase | 120–6000 | 200 to 1500 |

When mixtures of the commercial products SP 249, Celluclast and Norozym 188 are employed, these ranges correspond substantially to 0.5 to 5 kg of mixture per ton of beets or chicory roots.

It should be noted that the enzyme activity units mentioned correspond to units determined by methods developed by the company NOVO INDUSTRI A/S, which are available from this company on request.

For an optimum enzyme activity, the temperature during the prehydrolysis and the hydrolysis stages will be between 35° and 60° C. The temperature will preferably be between 35° and 55° C. during the prehydrolysis (c) and between 45° and 55° C. during the hydrolysis (e).

The duration of the prehydrolysis stage (c) may range from 1 to 6 hours, preferably 1 to 3 hours, and that of the hydrolysis (e) may range from 20 to 120 hours, preferably from 24 to 72 hours.

The stage (d) of fine grinding to a slurry form may be performed in any apparatus which exerts a high shearing effect. An example of an apparatus which proved to be particularly well suited is a finer of the type of those employed in the paper pump industry. In this stage, the beet pieces are reduced to a size of the order of approximately 0.1 mm or less.

The process which has just been described forms the basic process of the invention.

This process may be improved by combining it with one or more of the following improvements which are optional in nature:

A first improvement consists in carrying out, before or during the coarse grinding stage (a), a heat treatment of the beets or the chicory roots, which consists in heating them to a temperature from 70° to 90° C. for a few minutes to approximately 1 hour, for example with steam. This heat treatment has several advantageous effects:

it makes it easier to break the beets or the chicory roots into pieces in stage (a); it enables the quantity of bacteriostatic agent to be employed to be reduced or even omitted, it enables the foaming which may occur in stage (a) to be prevented or reduced to a large extent, it enables the browning of the beet pieces to be significantly restricted and very slightly colored beet hydrolysate syrups to be obtained, whereas the products obtained without heat treatment are dark brown to black in color, for a given enzyme dose, it improves the properties of the hydrolysate (lower viscosity and higher degree of conversion) or alternatively, enables a lower enzyme dose to be employed in order to obtain a given viscosity and a given degree of conversion of the hydrolysate.

A second improvement consists in carrying out, after the hydrolysis stage (e), a post-hydrolysis performed at a temperature equal to or higher than that for the actual hydrolysis stage, preferably within the range from 55° to 75° C. This post-hydrolysis will also be usually carried out at a lower pH than that for the hydrolysis, in the case where no additional enzymes are added as defined below in connection with the third improvement, while not working at a pH below 3. For example, if the hydrolysis (e) is carried out at pH 4, the posthydrolysis could be carried out at pH 3. In the case where additional enzymes are added, the pH will be adjusted depending on the optimum pH for enzyme activity. The duration of this post-hydrolysis may range from a few minutes to approximately 10 hours.

The use of a post-hydrolysis stage enables the conversion into glucose and fructose to be improved at the expense of polysaccharides having a degree of polymerization of 2 (sucrose) or more.

A third improvement consists in using, in addition to the enzyme mixture defined, an invertase or an inulinase or, preferably, a mixture of these two enzymes. The enzyme or the enzyme mixture may be added at a rate of 100 to 10,000 INU/kg of dry matter. This addition may be carried out simultaneously with that of the other enzymes or subsequently, for example during the hydrolysis or the post-hydrolysis stage. An invertase/fungal inulinase enzyme mixture which is particularly well suited is that marketed under the tradename "Novozym 230" by NOVO INDUSTRI A/S, or a yeast invertase.

The use of this or these additional enzymes enables the conversion into glucose and fructose to be improved at the expense of polysaccharides having a degree of polymerization of 2 (sucrose) or more, as does the second improvement above.

By way of a new product, the invention also relates to a liquid aqueous product obtained directly by the enzymatic hydrolysis of beets or of chicory roots, which contains, as main ingredients, glucose, fructose, polysaccharides having degrees of polymerization of 2 and 3, and nitrogen-containing compounds, this product having an acid pH, a viscosity not greater than 300 mPa.s and a solids content in suspension which does not exceed 2% by weight.

It relates especially to such a liquid aqueous product having a pH from 4 to 5 and a viscosity not greater than 150 mPa.s.

It also relates to aqueous products obtained by concentrating and optionally clarifying the liquid aqueous product.

For example, starting with sugar beets having the following typical composition:

| CONSTITUENTS | KG/T |
|---|---|
| SUCROSE | 160 |

-continued

| CONSTITUENTS | KG/T |
|---|---|
| NON-SUGAR SOLUBLES (1) | 20 |
| INSOLUBLES (2) | 50 |
| of which CELLULOSE | 10 |
| INORGANIC SUBSTANCES | 8 |
| WATER | 770 |

It is possible to obtain a liquid hydrolysed product typically having the following properties:

| | |
|---|---|
| pH | 4–4.5 |
| DENSITY | 1.09 |
| VISCOSITY (mPa · s) | 50–150 |
| SUSPENDED MATTER (% w/w) | 0.8–1.5 |
| REFRACTOMETRIC DRY MATTER | 20–22 g/100 g of solution |
| TOTAL DRY MATTER (%) | 24–25 |
| TOTAL SUGARS (expressed as glucose equivalent): | 16–200 g/l |
| BIOCHEMICAL NATURE | Proportion, % |
| GLUCOSE | 30–33 |
| FRUCTOSE | 17–27 |
| DP2(3) | 23–25 |
| DP3(3) | 21–14 |
| DP4(3) and higher | 3–0.5 |
| PENTOSES } GALACTURONIC ACID } | 10–20 |
| NITROGEN (%) (× 6.25) | 0.5–1.3 |

(3)DPn: polysaccharide having a degree of polymerization n

This product may be clarified in order to remove suspended insoluble substances, for example by filtration or even by centrifugation, and/or concentrated, for example using a rotary evaporator. The properties of clarified, concentrated clarified, and concentrated hydrolysates obtained starting with a sugar beet hydrolysate are given below for guidance.

| CLARIFIED HYDROLYSATE | |
|---|---|
| DENSITY | 1.09 |
| VISCOSITY (mPa · s) | 5–10 |
| REFRACTOMETRIC DRY MATTER | 20–22 g/100 g of solution |
| SUGAR COMPOSITION IDENTICAL TO THAT OF THE CRUDE HYDROLYSATE | |
| CONCENTRATED CLARIFIED HYDROLYSATE | |
| DENSITY | 1.3 |
| VISCOSITY (mPa · s at 20° C.) | 90 |
| REFRACTOMETRIC DRY MATTER | 63–67 g/100 g of solution |
| RELATIVE SUGAR COMPOSITION IDENTICAL TO THAT OF THE CLARIFIED HYDROLYSATE | |
| CONCENTRATED CRUDE HYDROLYSATE | |
| DENSITY | 1.35 |
| VISCOSITY (mPa · s at 20° C.) | 18–20 |
| REFRACOMETRIC DRY MATTER | 50–60 g/100 g of solution |
| WATER ACTIVITY | 0.78–0.82 |
| SUGAR COMPOSITION IDENTICAL TO THAT OF THE CRUDE HYDROLYSATE | |

Irrespective of whether they are crude and/or clarified and/or concentrated, the hydrolysates of the invention are products which can be used especially for the production of ethyl alcohol by conventional alcoholic fermentation using yeasts. Alcohol may be produced with improved yields ((3 to 12 additional percentage values) relative to the conventional technique. However, care should be taken to ensure that the residual activity of the bacteriostatic agent does not hinder the development of yeasts or their fermenting activity.

The following non-limiting examples are given in order to illustrate the invention.

EXAMPLES 1 TO 8

These examples were accomplished using the pilot-scale installation shown diagramatically in the single FIGURE.

This installation comprises a rotary helical blade type of grinder-mixer 1 open at its upper part for introducing the beets and the various ingredients to be incorporated (acid, bacteriostatic agent, enzymes), and connected at its lower part, via a pipe 2 equipped with a valve 3, to a pump 4. This pump 4 itself is connected to a finer 5 via a pipe 6 equipped with a valve 7. The pipe 6 is connected at its median part to a pipe 8 which returns to the top of the grinder 1. At the outlet of the finer 5, there is provided a pipe 9 connected to the pipe 8. Between the point of attachment of pipes 8 and 9 and the pipe 6, there is provided, on the pipe 8, a valve 10, whereas a valve 11 is arranged on the pipe 8 just before the top of the grinder 1. Upstream of the valve 11, the pipe 8 is connected to a pipe 12 leading to the reactor 13 containing stirrer blades 14, a valve 15 being provided on the pipe 12. An exit pipe 16 is provided at the base of the reactor 13 and is controlled by a valve 17. A water circulation jacket 18 is provided around the reactor so as to regulate the temperature of the reactor, it being possible to introduce cold water or hot water therein depending on whether it is desired to cool or to heat the reactor.

The operation of this installation is as follows:

The grinder 1 being set in motion, the beets, the acid, the bacteriostatic agent and the enzyme mixture are introduced therein.

When the reduction in size of the beet pieces and the extent of prehydrolysis have progressed to a sufficient extent to make it possible to pump the mixture, the valve 3 is opened and the pump 4 and the finer 5 are set in motion, the valves 7 and 11 being open and the valves 10 and 15 closed, so as to make the beet pieces to pass into the finer 5 and to recycle them to the grinder 1. In this operation, the size of the beet pieces is greatly reduced, for example to a size of the order of approximately 0.1 mm or less. At the end of this operation, the valves 7 and 11 are closed and the valves 10 and 15 are opened so as to direct the ground beets which are in the form of a pump or a suspension and which have been prehydrolysed, to the reactor 14 where they are left for the length of time required to achieve hydrolysis. Finally, the liquefied and hydrolysed beets are evacuated from the reactor via the exit 16, after opening the valve 17.

The efficiency of hydrolysis is determined in these trials by the degree of conversion (or degree of liquefaction) X of the normally insoluble substances in beets:

$$X = \frac{So - St}{So} = 1 - \frac{St}{So}$$

where So is the initial concentration of insoluble substances in beets and St is the concentration of insoluble substances at time t.

In all trials, the sugar beets were ground in a LAMORT helical blade grinder-mixer of a type employed in the paper pump industry (pulper) in the presence of the additives: sulfuric acid (pH-regulating agent), formol (bacteriostatic agent) and enzyme mixture. The beets were treated in the grinder-mixer for approximately 1 hour by operating the latter intermittently so as not to exceed approximately 50° C., and subjected to three successive passages through the finer, which is also a LAMORT finer of a type employed in the paper pulp industry (refiner), with recycling to the grinder so that the duration of prehydrolysis in the grinder is approximately 2–3 hours. Finally, the prehydrolysed ground product was transferred to the reactor in order to complete the hydrolysis. The proportion of formol was 0.1% by weight relative to the weight of beets. The pH and the proportion of enzymes were as given in the following table which summarizes the operating conditions for the treatment and the result of the trials.

TABLE

| | Enzyme mixture | | | Hydrolysis | | Degree of | Viscosity of the product |
|---|---|---|---|---|---|---|---|
| Trial | nature | proportion liter/tonne | pH | temp. °C. | duration hour | conversion % | obtained mPa · s (cP) |
| 1 | A(1) | 0.83 | 4.7 | 50 | 70 | 61 | 300 |
| 2 | A(1) | 1.67 | 4 | 50 | 70 | 80 | 55 |
| 3 | A(1) | 1.25 | 4 | 50 | 48 | 77 | 85 |
| 4 | A(1) | 1.25 | 4 | 50 | 32/72 | 76/84 | 70/<30 |
| 5 | B(2) | 1.25 | 4 | 55 | 46 | 78 | 65 |
| 6(3) | A(1) | 1.25 | 4 | 50 | 46 | 86 | 35 |
| 7 | A(1) + | 1.26 | 3.68 | 50 | 48 | 76.1 | 30 |
| | SP 300 | 0.2 kg/t | | | | | |
| 8 | A(1) + | 1.26 | 3.60 | 50 | 48 | 68.5 | 115 |
| | Pectinex 3XL(4) | 1.25 | | | | | |

(1) mixture, by weight, of 75% of SP 249, 20% of Celluclast and 5% of Novozym 188
(2) mixture, by weight, of 75% of SP 249, 20% of SP 300 and 5% of Novozym 188.
(3) trial carried out starting with fodder beets containing 12.3% sugar.
(4) Pectinex 3XL is a pectinase marketed by NOVO FERMENT. A. G., Basel (Switzerland)

EXAMPLE 9

This example illustrates the optional use of a heat treatment.

20 kg of whole sugar beets are placed in a container equipped with a steam supply device. Steam is allowed to enter into the container; the core temperature of the beet increases from 3° C. (initially) to 75° C. in approximately 1 h 30 min.

The beets thus treated are then charged into a LAMORT 201 pumper and cooled, during the pulping, to 45° C., the pH is adjusted to 5 with sulfuric acid and formol (1 liter/t) and an enzyme mixture consisting, by weight, of 50% of SP 311, 20% of Celluclast and 30% of Novozym 188 at a dose of 1 liter/t are added. SP 311 is a crude preparation of SPS-ase marketed by NOVO INDUSTRI A/S. Prehydrolysis is carried out for approximately 3 h 30 min, at the end of which time the viscosity is decreased to 1,100 mPa.s. The product is then refined by two consecutive passages through a laboratory refiner (Megatron MT 48/2). Hydrolysis is then carried out in a stirred reactor at pH=4 and T=55° C.

After 24 hours of hydrolysis, the viscosity is no more than 28 mPa.s and the degree of conversion of insolubles is 78%. After 48 hours, the viscosity is very much lower than 30 mPa.s (determination limit of the apparatus) and the degree of conversion reaches 89%.

EXAMPLES 10 AND 11 AND CONTROL EXAMPLE A

These examples illustrate the use of a post-hydrolysis stage and the addition of an invertase/inulinase (Novozym 230) enzyme mixture to the basic enzyme mixture respectively.

The following table summarizes the operating conditions and the results obtained.

| EXAMPLE | A | 10 | 11 |
|---|---|---|---|
| Beet type | Virtus | Virtus | Virtus |
| Prehydrolysis stage* | | | |
| Enzyme mixture of Ex. 9 L/tonne of beets | 0.7 | 0.7 | 0.7 |
| Novozym 230, L/tonne of beets | — | — | 0.05 |
| Formol, L/t | 1 | 1 | 1 |
| Duration, h | 3 | 3 | 3 |
| TEMPERATURE, °C. | 45 | 45 | 45 |
| pH | 4.6–5 | 4.6–5 | 5 |
| fine grinding stage**, number of passages | 2 | 2 | 2 |
| Hydrolysis stage | | | |
| duration, h | 48 | 48 | 48 |
| temperature, °C. | 55 | 55 | 55 |
| pH | 4 | 4 | 4 |
| Post-hydrolysis | | | |
| duration, h | — | 7 | — |
| temperature, °C. | — | 70 | — |
| pH | — | 3 | — |
| Composition of the hydrolysate, % relative to total sugars | | | |
| Glucose | 24 | 46 | 45 |
| Fructose | 21 | 41 | 42 |
| DP2 | 33 | 8 | 5 |
| DP3 | 6 | 0.9 | 1 |
| DP4 | 16 | 0 | 2 |
| DPn | — | 3.6 | 5 |

*before the prehydrolysis, the beets were coarsely ground in a LAMORT 201 pulper.
**number of passages through a MEGATRON MT 48/2 laboratory refiner.

It is seen from these results that the use of a post-hydrolysis treatment or the addition of invertase/inulinase greatly improves the degrees of conversion into glucose and fructose.

EXAMPLES 12 AND 13

These examples illustrate the treatment of chicory roots by the process of the invention. In each of these examples, approximately 10 kg of previously washed chicory roots were treated.

The operating conditions employed and the results obtained are summarized below:

| | EX. 12 | EX. 13 |
|---|---|---|
| Heat treatment with steam | none | for 1 h 30 min |
| Coarse grinding in a LAMORT 201 pulper | yes | yes |
| Prehydrolysis | | |
| enzyme(s) employed | SP 249 | SP 311 (50%) +Celluclast (20%) +Novozym 188 (30%) |
| proportion of enzymes, l/tonne of substrate | 1.25 | 1 |
| proportion of formol, l/tonne of substrate | 1 | 0.5 |
| duration, hours | 4 | 3 |
| temperature, °C. | 45 | 45 |
| pH | 5 | 5 |
| fine grinding, no. of passages in a Megatron MT 48/2 refiner | 2 | 2 |
| Hydrolysis | | |
| duration, hours | 42 | 44 |
| temperature, °C. | 55 | 55 |
| pH | 4 | 4 |
| Post-hydrolysis | | |
| additional enzyme added, | Novozym 230 | none |
| l/tonne of substrate | 0.1 | |
| duration, h | 24 | none |
| temperature, °C. | 55 | |
| pH | 4.5 | |
| Composition and property of the hydrolysate | | |
| Glucose, g/kg | 26.9 | 33.7 |
| Fructose, g/kg | 104.3 | 105.9 |
| Saccharose (DP2), g/kg | 2.2 | 3.8 |
| total fermentable sugars expressed in the form of glucose g/kg | 133.4 | 143.5 |
| Degree of conversion | 71 | 72 |
| Viscosity, mPa · s | 180 | 30 |

We claim:

1. A process for the liquefaction of beets or chicory roots, comprising the following stages:
   (a) grinding washed beets or washed chicory roots to provide a ground product;
   (b) adding to and mixing with said beets or chicory roots during or after their grinding in stage (a) a mixture of enzymes comprising SPS-ase, cellulase and cellobiase, said enzymes being employed, based on activity units per kg of dry matter contained in the beets or chicory roots, of 15 to 800 SPS-ase, 380 to 42000 cellulase and 10 to 4500 cellobiase; and an acid so as to adjust the pH of the ground product to within about 3 to 5.5;
   (c) leaving the enzyme mixture to accomplish a prehydrolysis of the ground product for approximately 1 to 6 hours;
   (d) after stage (c), additionally grinding the ground product;
   (e) further hydrolyzing the ground product resulting from step (d) by the enzyme mixture for approximately 20 to 120 hours; and
   (f) recovering the resulting liquid hydrolysed product.

2. A process as claimed in claim 1, wherein in stage (b) the pH is adjusted to within the range from 3.5 to 5.

3. A process as claimed in claim 1, wherein stage (c) lasts for 1–3 hours.

4. A process as claimed in claim 1, wherein the ground product resulting from stage (d) contains particles whose sizes are 0.1 mm or less.

5. A process as claimed in claim 1, wherein the hydrolysis stage (e) lasts for 24 to 72 hours.

6. A process as claimed in claim 1, wherein the temperature in stages (c) and (e) is maintained within the range from 35° to 60° C.

7. A process as claimed in claim 6, wherein the temperature is maintained between 35° and 55° C. in stage (c) and between 45° and 55° C. in stage (e).

8. A process as claimed in claim 1, wherein the enzymes are employed in the following proportions:

| | | |
|---|---|---|
| SPS-ase | 20 to 190 | U/kg of dry matter |
| Cellulase | 700 to 7000 | U/kg of dry matter |
| Cellubiase | 20 to 400 | U/kg of dry matter. |

9. A process as claimed in claim 1, wherein the enzyme mixture additionally contains the following additional enzymes in the following proportions expressed in terms activity units per kg of dry matter contained in the beets or the chicory roots:

| | |
|---|---|
| Polygalacturonase | 5000 to 250000 |
| Pectinase | 1000 to 55000 |
| Fungal $\beta$-glucanase | 40 to 2500 |
| Hemicellulase | 120 to 6000. |

10. A process as claimed in claim 9, wherein said additional enzymes are employed in the following proportions, expressed in terms of activity units per kg of dry matter contained in the beets or chicory roots:

| | |
|---|---|
| polygalacturonase | 9000 to 60000 |
| Pectinase | 2000 to 14000 |
| Fungal $\beta$-glucanase | 80 to 550 |
| Hemicellulase | 200 to 1500. |

11. A process as claimed in claim 1, wherein the enzyme mixture contains, by weight, 50–75% of SPS-ase, 5–50% of cellulase and 5–50% of cellobiase.

12. A process as claimed in claim 1, including heating said beets or chicory roots to a temperature from 70° to 90° C. for a few minutes to approximately 1 hour before or during stage (a).

13. A process as claimed in claim 1, wherein, in addition, after the hydrolysis stage (e), a post-hydrolysis at a temperature from 55° to 75° C. and for a period of a few minutes to approximately 10 hours, is carried out.

14. A process as claimed in claim 13, wherein the post-hydrolysis is carried out at a pH below the pH employed for the hydrolysis (e), which is between pH 3 and 5.5.

15. A process as claimed in claim 1, wherein, in addition to the enzyme mixture defined, an invertase enzyme or inulinase enzyme or a mixture of the two is additionally employed.

* * * * *